UNITED STATES PATENT OFFICE.

ROBERT A. CHESEBROUGH, OF NEW YORK, N. Y.

PROCESS OF OBTAINING THE PERFUMES OF NATURAL FLOWERS BY ABSORPTION.

SPECIFICATION forming part of Letters Patent No. 238,277, dated March 1, 1881.

Application filed March 28, 1877. Patented in France March 23, 1877.

*To all whom it may concern:*

Be it known that I, ROBERT A. CHESEBROUGH, of the city of New York, county and State of New York, have invented certain Improvements in the art known as "Enfleurage," or the Process of Obtaining the Perfumes of Natural Flowers by Absorption, of which the following is a specification.

The process known as "enfleurage" consists in obtaining from certain delicate plants, such as the tuberose, jasmine, &c., their perfume by absorbing the same into lard, suet, or olive-oil, with which substances the flowers are kept in contact immediately after they are gathered. The perfumed fat or oil is put up in cans for sale as an article of commerce, and this industry is quite largely carried on in the southern part of France.

My invention consists in substituting for lard, suet, and the other animal and vegetable fats and oils which have heretofore been used, a certain product from petroleum called "vaseline," now manufactured by me, and certain refined oils from petroleum, (not distillates,) which, by the bone-black process of manufacture, can be rendered quite free from the color, odor, and taste of petroleum.

I have discovered that highly-refined vaseline and petroleum-oil (such as described) possess the qualities of readily absorbing the perfumes of flowers into themselves, and also of preserving these perfumes unimpaired for a long period.

Directions for adapting my system of enfleurage are as follows: Have a wooden chest made about two feet high and about two and one-half feet square, although the dimensions are matters more of convenience than of importance. Into this chest have fitted a number of trays about four inches deep and corresponding in size otherwise to the length and breadth of the chest, so that they will rest one on the other when placed in it. These trays should have plate-glass bottoms, and have handles in their sides, so that they can be removed from and placed in the chest at pleasure. A layer of vaseline about two inches deep is then spread over the glass bottoms on the inside of the trays, and on the vaseline is laid a thick layer of freshly-gathered flowers freed from stems and leaves. The trays are then placed in the chest, one on the other, until the chest is full, and its cover is then closed over the whole. After about twenty-four hours the trays are taken out, the old flowers removed, and their places supplied with fresh ones, when the trays are replaced and the cover closed, as before. The perfume is absorbed by the vaseline from the flowers, and its strength of perfume depends upon the quantity of flowers used. By renewing the flowers many times, as described, the perfume can be brought to the desired strength. The vaseline should then be carefully removed from the trays and cleansed from all leaves or sediment by straining or pressing through a fine strainer or cotton cloth. It is then put up in cans, and is ready for market or use.

If a perfumed oil, instead of a pomade, is required, the flowers can be either wholly immersed in the oil contained in deep jars, or shallow pans may be substituted for trays, and the flowers partially immersed in the oil. After the proper interval the used flowers can be removed from the jars or pans, the adhering oil strained back, and their place supplied by fresh flowers, this process being continued until the oil has obtained the requisite strength of perfume, when it is strained and then bottled for use.

By my invention a great advantage is obtained over the old system, in that perfumed pomade and oil made according to my improvement will keep for an indefinite period without becoming rancid or losing its character or value.

Perfumed pomade and oil made on the old system cannot be kept but for varying and uncertain periods, as they gradually spoil in time and are subject to decomposition and deterioration, and if kept for a long time become worthless.

The highly-refined products of petroleum, such as are described and used by me, are better as bases for the absorption and retention of perfumes than animal and vegetable oils and fats, as they have no odors or distinctive characteristics of their own which will modify, change, or overcome the absorbed perfume, and as these products are also not soluble in alcohol, the perfumer can readily extract the perfumes from these products, when desirable to do so, in the usual manner.

It is evident that the means employed for bringing the vaseline and flowers in contact may be varied, so that I do not confine myself to any particular method.

I claim—

1. The improved process of enfleurage herein described, the same consisting, essentially, in steeping natural flowers in vaseline or refined petroleum until the odoriferous principle of the flowers is transferred to or absorbed by the vaseline.

2. As a new article of manufacture, a perfume consisting of vaseline impregnated with the primary odors of natural flowers, substantially as described.

ROBT. A. CHESEBROUGH.

Witnesses:
W. E. McCREDY,
THOS. J. O'CONNELL.